United States Patent
Potier et al.

(10) Patent No.: US 12,072,010 B2
(45) Date of Patent: Aug. 27, 2024

(54) STRAIN WAVE GEARING

(71) Applicant: Goodrich Actuation Systems SAS, Vernon (FR)

(72) Inventors: Karl Potier, Aix en Provence (FR); Corentin Boitard, Maisons-Laffitte (FR)

(73) Assignee: GOODRICH ACTUATION SYSTEMS SAS, Saint-Marcel (FR)

( * ) Notice: Subject to any disclaimer, the term of this patent is extended or adjusted under 35 U.S.C. 154(b) by 0 days.

(21) Appl. No.: 18/332,282

(22) Filed: Jun. 9, 2023

(65) Prior Publication Data

US 2023/0407956 A1    Dec. 21, 2023

(30) Foreign Application Priority Data

Jun. 20, 2022  (EP) .................................... 22305892

(51) Int. Cl.
| | | |
|---|---|---|
| *F16H 49/00* | (2006.01) | |
| *B64C 13/50* | (2006.01) | |
| *F16H 19/08* | (2006.01) | |

(52) U.S. Cl.
CPC ........... *F16H 49/001* (2013.01); *B64C 13/50* (2013.01); *F16H 19/08* (2013.01); *F16H 2049/003* (2013.01)

(58) Field of Classification Search
CPC .. F16H 49/001; F16H 19/08; F16H 2049/003; F16H 55/0833; F16H 1/32; F16H 55/17; F16H 2057/0225; B64C 13/50; B64C 13/24; B64C 13/28
See application file for complete search history.

(56) References Cited

U.S. PATENT DOCUMENTS

| | | | |
|---|---|---|---|
| 5,626,055 A | * | 5/1997 | Fukui .................... F16H 19/043 |
| | | | 477/9 |
| 8,191,821 B2 | | 6/2012 | Knight |
| 10,274,070 B2 | | 4/2019 | Park |
| 2015/0184700 A1 | | 7/2015 | Balsiger |
| 2015/0345606 A1 | | 12/2015 | Balsiger |

FOREIGN PATENT DOCUMENTS

| | | |
|---|---|---|
| GB | 2500185 A | 9/2013 |
| SU | 597892 A1 | 3/1978 |

OTHER PUBLICATIONS

European Search Report for Application No. 22305892.6, mailed Nov. 14, 2022, 13 pages.

* cited by examiner

*Primary Examiner* — Victor L Macarthur
(74) *Attorney, Agent, or Firm* — CANTOR COLBURN LLP

(57) ABSTRACT

A strain wave gear mechanism includes: a casing; an elliptical drive shaft; an outer ring arranged coaxially around the elliptical drive shaft and rotationally fixed to the casing, the outer ring having a toothed inner circumference; a flexible ring mounted around the elliptical drive shaft radially inwards of the outer ring, the flexible ring having a toothed outer circumference. Rotation of the elliptical drive shaft causes elliptical rotation of the flexible ring relative to the outer ring such that teeth of the flexible ring engage with teeth of the outer ring at points corresponding to the major axis of the ellipse of the drive shaft to cause movement of the flexible ring in a direction opposite to rotation of the drive shaft. The outer ring is rotationally fixed to the casing via a solenoid operated disconnect gear configured to selectively disconnect the outer ring from the casing.

13 Claims, 2 Drawing Sheets

STRAIN WAVE GEARING

CROSS REFERENCE TO RELATED APPLICATION

Figure 1:
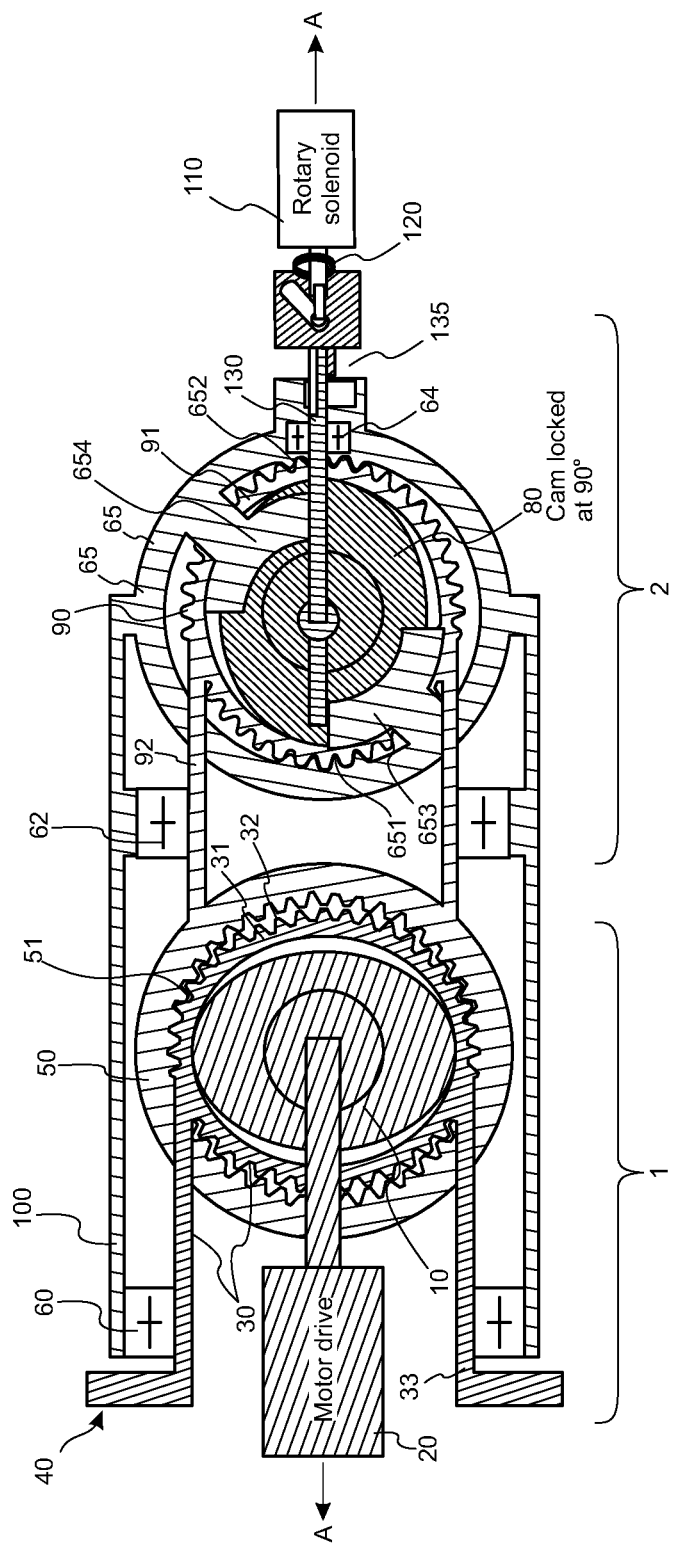

This application claims priority to European Patent Application No. 22305892.6 filed Jun. 20, 2022, the entire contents of which is incorporated herein by reference.

TECHNICAL FIELD

The present disclosure relates to strain wave gearing systems e.g. for use in controlling flight control actuators.

BACKGROUND

Strain wave gearing, also known as a harmonic drive, is used in many drive trains as it is compact and lightweight and can be used to provide a high gear ratio between an input or drive shaft and an output shaft. These properties make strain wave gearing suited to use in aircraft and other vehicles where space is limited and weight of components should be minimised, whilst maintaining reliability and performance.

A strain wave gear system includes a wave generator which is in the form of an elliptical shaft and a compliant ball bearing in which the elliptical shaft rotates. A flexible toothed ring (a flex spline) is mounted about the wave generator and engages, and conforms to the shape of, the output shaft. A fixed outer ring is provided around the flex spline and has inner teeth that engage with the outer teeth of the flex spline but, due to the elliptical shape of the wave generator, this only forces the flex spline to engage with the teeth of the outer ring at certain degrees of rotation.

In operation, the drive shaft is rotated e.g. by a motor. The bearing conforms to the elliptical shape of the drive shaft. The flex spline conforms to the shape of the drive shaft and so as it rotates, it will only engage with the inner teeth of the outer ring at the major axes of the ellipse. Rotation of the drive shaft thus causes a slower rotation of the flex spline, in the opposite direction and, therefore, a slower rotation of the output shaft to which the flex spline is connected.

Although strain wave gearing has many advantages, it has very low reversibility, i.e. it has low ability to back drive. This limits applicability of strain wave gearing in many applications where it would otherwise be particularly useful because of its small size and weight and its high reduction gear ratio. For example, a promising technology for the next generation thin wing aircraft is the use of rotary electromechanical actuators (EMAs) for operating flight control surfaces. Known rotary EMA systems, however, typically need a high gear ratio and so require a relatively large gearbox. It would be advantageous to be able to use a strain wave gearbox to reduce the size and weight and allow use of such rotary EMAs. The problem is that the gear system for flight control surfaces needs to be able to operate in reverse, which means that current strain wave gearing is not a valid option. Other applications requiring gearboxes may also benefit from smaller, lighter gearing but may be constrained from using strain wave gearing because of its lack of reversibility.

There is, therefore, a need for a strain wave gearing system that provides all of the advantages of existing strain wave gearing but also has improved back drive or reversibility capabilities.

SUMMARY

According to the disclosure, there is provided a strain wave gear mechanism comprising: a casing; an elliptical drive shaft; an outer ring arranged coaxially around the elliptical drive shaft and rotationally fixed to the casing, the outer ring having a toothed inner circumference; a flexible ring mounted around the elliptical drive shaft radially inwards of the outer ring, the flexible ring having a toothed outer circumference, wherein rotation of the elliptical drive shaft causes elliptical rotation of the flexible ring relative to the outer ring such that teeth of the flexible ring engage with teeth of the outer ring at points corresponding to the major axis of the ellipse of the drive shaft to cause movement of the flexible ring in a direction opposite to rotation of the drive shaft; and wherein the outer ring is rotationally fixed to the casing via a solenoid operated disconnect gear configured to selectively disconnect the outer ring from the casing to permit reverse operation of the strain wave gear mechanism.

In an embodiment, the disconnect gear comprises: a disconnect mechanism outer ring attached to or integral with the casing; a rotatable cam having an elliptical cross-section and arranged coaxial with and radially inwards of the disconnect mechanism outer ring; and a disconnect mechanism flexible ring mounted around the cam radially inwards of the disconnect mechanism outer ring and fixedly connected to the outer ring, the disconnect mechanism flexible ring having a toothed outer circumference, wherein the cam is rotatable by means of the solenoid, between a first position and a second position, wherein in the first position, the major axis of the ellipse of the cam is aligned with teeth on the inner circumference of the disconnect mechanism outer ring such that the teeth of the disconnect mechanism flexible ring are deformed into engagement with the teeth on the inner circumference of the disconnect mechanism outer ring, and in the second position, the major axis of the ellipse of the cam is not aligned with teeth on the inner circumference of the disconnect mechanism outer ring such that the teeth of the disconnect mechanism flexible ring are not in engagement with the teeth on the inner circumference of the disconnect mechanism outer ring.

Also provided is an EMA with such a gear mechanism.

Features of embodiments are set out in the dependent claims. These features can be present alone or in combination.

BRIEF DESCRIPTION

Figure 2:
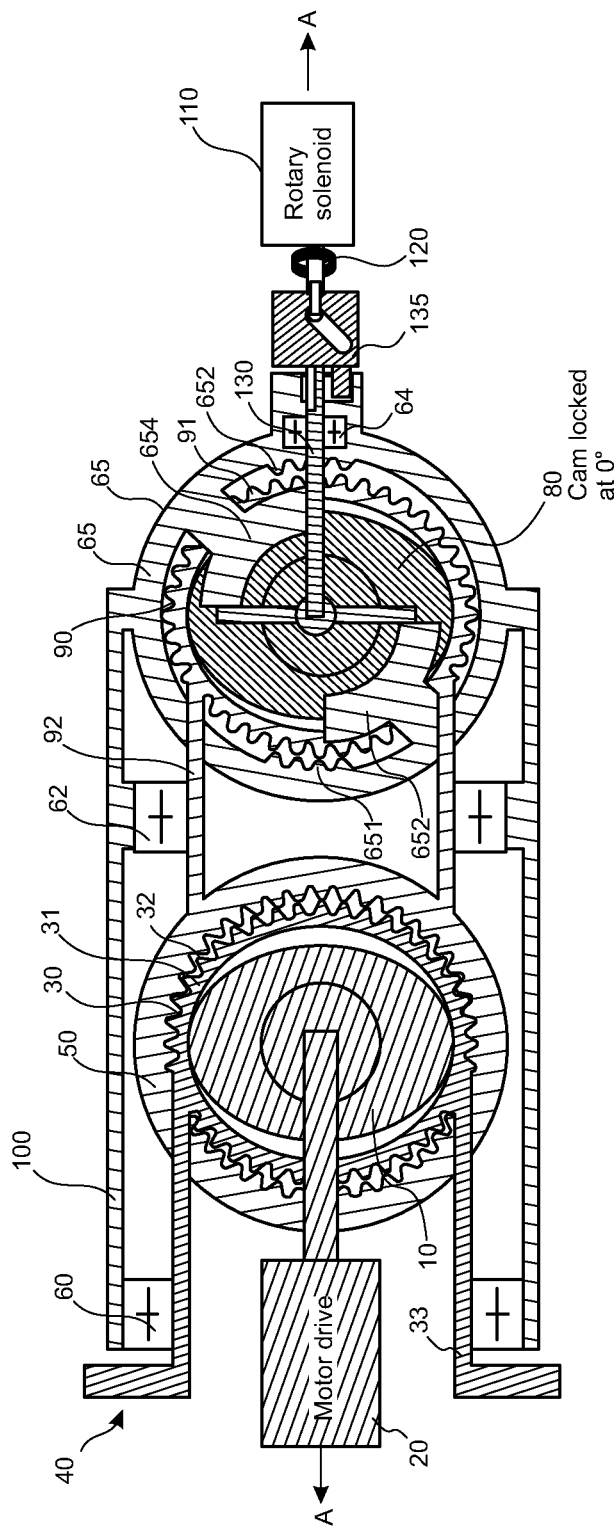

Examples according to the disclosure will now be described with reference to the drawings in which:

FIG. 1 is a schematic view of a strain wave gearing mechanism according to the disclosure, operating in an active mode; and FIG. 2 is a schematic view of the mechanism of FIG. 1 operating in a bypass mode.

It should be noted that these are examples only and variations are possible within the scope of the claims.

DETAILED DESCRIPTION

The drawings are only schematic and with parts shown in side-on orientation for ease of explanation only. In reality, the parts are arranged to rotate about axis A.

The mechanism according to the disclosure includes a first part 1 arranged in a gearbox casing 100. The first part 1 is substantially the same as the conventional strain wave gearing described above. This part 1 includes a wave generator 10 in the form of an elliptical shaft that is rotated by a motor drive 20. In one example, the nominal torque of the motor drive is 6 N.m but other values can, of course, also be used depending on system requirements. The flex spline 30 is in the form of a cup shape comprising an annular flexible element 31 that fits around, and conforms to the elliptical shaft 10, the ring having outer teeth 32 around its circumference. The walls 33 of the cup shape are more rigid than the ring 32, for connection and torque transmission to the output shaft 40. The rigid outer ring 50 is formed with teeth 51 around its inner circumference arranged to mesh with teeth 32 on the flex spline when they come into engagement. In the active (forward drive) mode, the mechanism of the invention functions in the same way as the conventional mechanism described above. Rotation of the drive shaft 10 rotates the flex spline 30 inside the circular outer ring 50. Because the flex spline assumes an oval or elliptical shape as the drive shaft rotates, whereas the outer shaft 50 is circular, the teeth 32 of the flex spline and the teeth 51 of the outer ring will only engage at two points at the major axes of the ellipse. The pitch and number of teeth is such that when the teeth do engage, the flex spline is moved a small distance in the direction opposite the rotational direction of the drive shaft, this causing a stepped down corresponding movement of the connected output shaft 40 relative to the casing 100 via bearings 60 between the output shaft and the casing. The outer ring 50 is fixed relative to the gearing casing 100 against rotation. Typically, the outer ring will be directly connected to the casing. In the present invention, however, the outer ring 50 is connected to the casing via a disconnect mechanism formed by the second, disconnect, part 2 of the mechanism of this invention.

The second part 2, will be explained further below. In the active/forward drive mode, however, this part is not activated and is disconnected from the first part, so has no effect of the operation of the first part. In other words, the outer ring 50 of the first part is fixed to the casing via the second part in its locked position (FIG. 1).

The second part 2 is arranged in axial alignment with the first part 1 (the axis being the axis along the drive shaft 10, through the rings 30, 50 and through the axially aligned output shaft). The gearing of the first and second parts is shown schematically in the drawings to simplify explanation but, in reality, all of the rings are arranged around axis A.

The second part has an outer ring 65 which is defined by the end of the casing 100. The outer ring has teeth 651, 652 at two positions on its inner circumference and includes two inwardly directed stops 653, 654. A cam 80 having an elliptical cross-section is provided within the outer ring 65. A flexible inner ring, similar to the flex spline of the first part, is provided as a flex disconnect spline 90 around the elliptical cam 80 and conforms to the oval/elliptical shape. Similar to the way in which the flex spline 30 of the first part 1 has a cup shaped with walls attached to the output shaft, the flex disconnect spline 90 has walls 92 extending from the flexible ring 91 that connected to the rigid outer ring 50 of the first part 1. Bearings 62 are provided between the casing 100 and the walls 92 of the flex disconnect spline 90. The second, disconnect part 2 is driven by means of a rotary solenoid 110 and rotary spring 120 via a locking cam 135 and locking cam rod 130 connected to the cam 80. Bearings 64 may be provided between the locking cam rod 130 and the casing end 65.

In forward drive mode, as shown in FIG. 1, the rotary solenoid 110 is energized and the rotary spring 120 is set such that the locking cam rod 130 abuts against the stops 653, 654 to hold the cam 80 in a rotational position in which its major axes are aligned with the teeth 651, 652 on the inside of the casing end outer ring 65. The teeth of the disconnect spline 90 therefore mesh with the fixed outer ring teeth and are held against further rotation due to the abutment of the locking cam rod with the stops 653, 654. Because the outer ring 50 of the first part is connected to the flex disconnect spline 90, and this is fixed relative to the casing 100, the outer ring 50 is secured against rotation allowing the first part 1 of the mechanism to operate in its normal forward operation. In this mode, the gear cannot be reversed.

To back-drive the mechanism, the second, disconnect part 2 of the mechanism operates in bypass mode, as described further below, to disengage the outer ring 50 from the casing 100. The bypass mode will be described with reference to FIG. 3. The parts are the same as, and therefore numbered as in FIG. 2. To operate in the bypass mode, the rotary solenoid 110 is de-energized which releases the spring 120 which, in turn, releases the locking cam 135 allowing the locking cam rod 130 and, hence, the cam 80 to which it is connected, to rotate out of abutment with the stop that was holding the cam at the engaged position, until the cam rod abuts against a next stop (here spaced 90 degrees from the first stop). The major axis of the ellipse of the cam 80 is therefore rotated relative to the outer ring 65 so that the teeth 651 and 652 are no longer in contact. In this configuration, the spline 90 is free to rotate and, because it is connected to the spline 90, the outer ring 50 is also free to rotate. When the outer ring 50 is free to move, the flex spline 30 becomes free to rotate and so the gear is reversible.

Thus, when the solenoid is energized, the gearing operates like a known strain wave gearing providing a high gear ratio and very little freeplay. When unpowered (the solenoid is de-energized), the spring 120 moves the cam 80 back (clockwise in the drawings) freeing the flex spline 90 and so making the gear reversible, i.e. the system is disconnected and becomes fully reversible.

It is expected that the mechanism would be particularly useful in areas where light, compact gearing with high gear ratio are desired, but where reversibility is also necessary or desirable, such as (but not only) in controlling aircraft flight control surfaces.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A strain wave gear mechanism comprising:
   a casing;
   an elliptical drive shaft;
   an outer ring arranged coaxially around the elliptical drive shaft and rotationally fixed to the casing, the outer ring having a toothed inner circumference; and
   a flexible ring mounted around the elliptical drive shaft radially inwards of the outer ring, the flexible ring having a toothed outer circumference,
   wherein rotation of the elliptical drive shaft causes elliptical rotation of the flexible ring relative to the outer ring such that teeth of the flexible ring engage with teeth of the outer ring at points corresponding to the major axis of the ellipse of the drive shaft to cause movement of the flexible ring in a direction opposite to rotation of the drive shaft;
   wherein the outer ring is rotationally fixed to the casing via a solenoid operated disconnect gear configured to selectively disconnect the outer ring from the casing to permit reverse operation of the strain wave gear mechanism.

2. The strain wave gear mechanism of claim 1, wherein the disconnect gear comprises:
   a disconnect mechanism outer ring attached to or integral with the casing;
   a rotatable cam having an elliptical cross-section and arranged coaxial with and radially inwards of the disconnect mechanism outer ring; and
   a disconnect mechanism flexible ring mounted around the cam radially inwards of the disconnect mechanism outer ring and fixedly connected to the outer ring, the disconnect mechanism flexible ring having a toothed outer circumference, wherein the cam is rotatable by means of the solenoid, between a first position and a second position, wherein in the first position, the major axis of the ellipse of the cam is aligned with teeth on the inner circumference of the disconnect mechanism outer ring such that the teeth of the disconnect mechanism flexible ring are deformed into engagement with the teeth on the inner circumference of the disconnect mechanism outer ring, and in the second position, the major axis of the ellipse of the cam is not aligned with teeth on the inner circumference of the disconnect mechanism outer ring such that the teeth of the disconnect mechanism flexible ring are not in engagement with the teeth on the inner circumference of the disconnect mechanism outer ring.

3. The strain wave gear mechanism of claim 2, wherein the disconnect gear further comprises stops to secure the cam in one of the first or the second positions.

4. The strain wave gear mechanism of claim 2, wherein the cam is rotated between the first position and the second position by means of a cam rod connected to the cam and attached to a rotary spring driven by the solenoid.

5. The strain wave gear mechanism of claim 4, wherein the cam rod extends from the solenoid and through the casing to the cam.

6. The strain wave gear mechanism of claim 5, further comprising bearings between the cam rod and the casing.

7. The strain wave gear mechanism of claim 2, wherein energisation of the solenoid drives the cam to the first position and de-energising the solenoid drives the cam to its second position.

8. The strain wave gear mechanism of claim 1, further comprising bearings between the flexible ring and the casing.

9. The strain wave gear mechanism of claim 1, further comprising bearings between the disconnect mechanism flexible ring and the casing.

10. The strain wave gear mechanism of claim 1, further comprising a motor connected to rotate the elliptical drive shaft.

11. The strain wave gear mechanism of claim 1, wherein in a forward drive mode of operation, the disconnect gear is configured to connect the outer ring to the casing to prevent rotation of the outer ring relative to the casing, and in a reverse mode of operation, the disconnect gear is configured to disconnect the outer ring from the casing to allow rotation of the outer ring.

12. An electromechanical actuator assembly comprising:
    a strain wave gear mechanism as claimed in claim 1.

13. An electromechanical actuator assembly as claimed in claim 12, for controlling a flight control surface of an aircraft.

* * * * *